(12) United States Patent
Rajwan et al.

(10) Patent No.: US 7,327,761 B2
(45) Date of Patent: Feb. 5, 2008

(54) DATA STREAMING

(75) Inventors: Doron Rajwan, Givataim (IL); Eyal Lubetzky, Givataim (IL); Joseph Yossi Azar, Ramat-Hasharon (IL)

(73) Assignee: Bandwiz Inc., Herzlia Pituach (IL)

( * ) Notice: Subject to any disclaimer, the term of this patent is extended or adjusted under 35 U.S.C. 154(b) by 1085 days.

(21) Appl. No.: 10/343,541

(22) PCT Filed: Aug. 1, 2001

(86) PCT No.: PCT/IL01/00716

§ 371 (c)(1),
(2), (4) Date: Jul. 17, 2003

(87) PCT Pub. No.: WO02/11364

PCT Pub. Date: Feb. 7, 2002

(65) Prior Publication Data

US 2004/0034712 A1    Feb. 19, 2004

Related U.S. Application Data

(63) Continuation-in-part of application No. 10/182,753, filed on Sep. 26, 2003, now abandoned, and a continuation-in-part of application No. 09/958,165, filed on Oct. 4, 2001, now abandoned.

(60) Provisional application No. 60/245,098, filed on Nov. 2, 2000, provisional application No. 60/245,000, filed on Nov. 1, 2000, provisional application No. 60/217,139, filed on Jul. 10, 2000, provisional application No. 60/179,926, filed on Feb. 3, 2000.

(51) Int. Cl.
*H04L 12/00*    (2006.01)

(52) U.S. Cl. ...................... 370/474; 370/468

(58) Field of Classification Search ............... 370/389, 370/390, 394, 432, 465, 466, 468, 473, 474, 370/476

See application file for complete search history.

(56) References Cited

U.S. PATENT DOCUMENTS

| | | | | |
|---|---|---|---|---|
| 6,014,694 | A | * | 1/2000 | Aharoni et al. ............. 709/219 |
| 6,134,243 | A | * | 10/2000 | Jones et al. ................. 370/465 |
| 6,141,053 | A | * | 10/2000 | Saukkonen ............ 375/240.01 |
| 6,426,943 | B1 | * | 7/2002 | Spinney et al. ............ 370/235 |
| 2001/0039579 | A1 | * | 11/2001 | Trcka et al. ................ 709/224 |

* cited by examiner

*Primary Examiner*—Ajit Patel

(57) ABSTRACT

A method of streaming data, comprising: receiving an input stream of data, at a transmitter; dividing the input stream into a plurality of blocks, at least one of which blocks is incomplete; generating a plurality of first packets based on at least one block of data; generating at least one second packet from at least one as yet incomplete block of data; said block comprising recently received data; transmitting said at least one first packet and at least one second packet to a receiver that can reconstruct said stream from said first packets and said second packets, said transmitting utilizing a differential protocol by which different parts of the data are transmitted at different rates, so that a receiver can join the transmission at any time and start receiving the data at a minimum delay; and generating at least one third packet from said at least one incomplete block; said at least one third packet being based at least in part on data received subsequent to data forming the basis for the at least one second packet; wherein said at least one second packet is transmitted at a higher rate than mandated by said protocol to compensate for a later repeated transmission of information carried in said at least one second packet at a lower rate than mandated by the protocol, once said at least one third packet is generated and transmitted.

63 Claims, 1 Drawing Sheet

US 7,327,761 B2

DATA STREAMING

RELATED APPLICATIONS

The present application is a U.S. national application of PCT Application No. PCT/IL01/00716, filed on Aug. 1, 2001. The present application claims the benefit under 35 U.S.C. §119(e) of U.S. Ser. No. 60/179,926 filed on Feb. 3, 2000, U.S. Ser. No. 60/217,139 filed on Jul. 10, 2000, U.S. Ser. No. 60/245,000 filed on Nov. 1, 2000 and U.S. Ser. No. 60/245,098 filed on Nov. 2, 2000. The present application is also continuation-in-part of U.S. application Ser. No. 10/182,753 filed Sep. 26, 2003, now abandoned and U.S. application Ser. No. 09/958,165 filed Oct. 04, 2001 now abandoned. The present application is also related to U.S. application Ser. No. 10/049,884. The disclosure of all of these applications are incorporated herein by reference.

FIELD OF THE INVENTION

The present invention is related to the transmission of stream information over a communication channel.

BACKGROUND OF THIS INVENTION

Many media types are typically provided in a streaming mode, for example movies and audio. An advantage of streaming is that there is substantially no delay at a receiver before the media can be previewed, providing the media stream is sent in a manner synchronized to the viewing. If a user is required to wait for a media stream to repeat itself, for example in a carousel transmission system, the delay is as long as the transmission repeat time.

Another type of media dissemination method is multicasting, which may be combined with streaming. A single copy of the media stream is broadcast to a plurality of receivers. In some implementations, a complete file is transmitted by multicasting, without streaming, or is repeatedly transmitted.

Another type of data dissemination method is "on-demand" transmission. The transmission of data is synchronized with a request by a user. This type of dissemination is provided by unicasting (point to point connection). Alternatively, a receiver can select a start time, out of a small number of available times, at each of which times a complete retransmission of the data is performed. A particular application of "on-demand" dissemination is cable broadcasting of movies. In some implementations, a complete file may be transmitted "on-demand", for viewing when convenient. In such a file transmission system, if a media file size is FS and an available transmission bandwidth is TB, a minimally expected delay before the file can be played back is FS/TB.

The following references describe methods of video on demand, their disclosures are incorporated herein by reference:

Darrell D. E. Long, Jehan-Francois Paris, Steven W. Carter "http://cs1.cse.ucse.edu/projects/video-on-demand/" present insight regarding video on demand and different transmission protocols (Harmonic Broadcasting, Pagoda Broadcasting), available on Jan. 9, 2001.

C. C. Aggarwal and J. L. Wolf and P. S. Yu. "A Permutation-Based Pyramid Broadcasting Scheme for Video-On-Demand Systems". Proc. Of the IEEE Int'l Conf. On Multimedia Systems. June 1996.

C. C. Aggarwal and J. L. Wolf and P. S. Yu. "On Optimal Batching Policies for Video-on-Demand Storage Server" Proc. Of the IEEE Int'l Conf. On Multimedia Systems. June 1996.

S. Viswanathan and T. Imielinski. "Metropolitan Area Video-On-Demand Service Using Pyramid Broadcasting". IEEE Multimedia Systems. 4:197-208, 1996.

K. A. Hua and S Sheu. "Skyscraper Broadcasting: A New Broadcasting Scheme for Metropolitan Video-On-Demand Systems". ACM SIGCOMM. September 1997.

A. Dan and P. Shahabuddin and D. Sitaram, "Scheduling policies for an on-demand video server with batching". In Proc. Of ACM Multimedia, October 1994, pp. 168-179.

A. Dan and D. Sitaram and P. Shahabuddin, "Dynamic Batching Policies for an On-Demand Video Server". In Multimedia Systems, 4:112-121, June 1996.

L. Gao, J. Kurose, D. Towsley, "Efficient Schemes for Broadcasting Popular Videos", Proceedings of NOSSDAV, Cambridge, UK, July 1998.

D. L. Eager and M. K. Vernon, "Dynamic Skyscraper Broadcasts for Video-On-Demand", Technical Report #1375, Computer Science Department, UW-Madison, May 1998.

SUMMARY OF THE INVENTION

An aspect of some embodiments of the invention relates to multicast transmission of a real-time stream of data, in which the data is comprised of a plurality of blocks transmitted as encoded or non encoded packets. In an exemplary embodiment of the invention blocks that relate to currently available data are incomplete and are transmitted using unencoded packets or packets encoded differently from the first packets. Optionally, the different encoding is of each packet independent of the other packets. In an exemplary embodiment of the invention a receiver is able to reconstruct a block using a mixture of encoded data and unencoded data. In an exemplary embodiment of the invention when a block is completed its encoding method is changed, optionally, without any notification.

An aspect of some embodiments of the invention relates to an asynchronous media transmission method in which at least one packet is transmitted synchronously in order to speed up the transmission of preferential parts. In an exemplary embodiment of the invention a receiver can immediately start continuous playback of the stream following reception of some synchronous packets. In an exemplary embodiment of the invention a first block or blocks are synchronously transmitted for example by unicast in order to eliminate a delay which would be caused by the need to collect enough packets in order to reconstruct and/or decode the packets transmitted by an asynchronous transmission. The rest of the blocks are optionally transmitted using a preferential multicast transmission method, for example, providing different effective transmission rates for different blocks.

There is thus provided, in accordance with an exemplary embodiment of the invention, a method of streaming data, comprising:

receiving an input stream of data, at a transmitter;

dividing the input stream into a plurality of blocks, at least one of which blocks is incomplete;

generating a plurality of first packets based on at least one block of data;

generating at least one second packet from at least one as yet incomplete block of data;

said block comprising recently received data;

transmitting said at least one first packet and at least one second packet to a receiver that can reconstruct said stream from said first packets and said second packets, said transmitting utilizing a differential protocol by which different parts of the data are transmitted at different rates, so that a receiver can join the transmission at any time and start receiving the data at a minimum delay; and generating at least one third packet from said at least one incomplete block;

said at least one third packet being based at least in part on data received subsequent to data forming the basis for the at least one second packet;

wherein said at least one second packet is transmitted at a higher rate than mandated by said protocol to compensate for a later repeated transmission of information carried in said at least one second packet at a lower rate than mandated by the protocol, once said at least one third packet is generated and transmitted.

In an embodiment of the invention, the input stream is received by said receiver as it is being created.

Optionally, the input stream is decodable by said receiver with a delay of less than the transmission and decoding time of one block, from said transmitter.

Optionally, the receiver has a reception bandwidth less than 150%, 130%, 120% or 110% of a transmission bandwidth of said transmitter.

Optionally, the at least one second packet is not FEC (forward error correction) encoded. Alternatively, the at least one second packet is FEC (forward error correction) encoded to inter-relate data already sent for said incomplete block.

Optionally, the at least one first packets are FEC (forward error correction) encoded.

Optionally, the at least one first packets are sent using a plurality of carousels. Optionally, the at least one first packets are sent using a single carousel.

Optionally, the at least one third packet is unicast. Optionally, the at least one first packets are multicast.

In an embodiment of the invention, said transmission optionally comprises transmission over a TV broadcast system. Alternatively or additionally, said transmission comprises transmission over a TV cable system. Alternatively or additionally, said transmission comprises transmission over a TV satellite system. Optionally, said transmission is digital. Alternatively, said transmission is analog. Alternatively, or additionally, said transmission comprises transmission over a computer network.

In an embodiment of the invention, a receiver can join said transmission in an asynchronous manner and experience a delay of less than the transmission and decoding time of one block, relative to a designated entry point into said stream. Optionally, said entry point is a start of said stream. Optionally, the entry point is a current time point of said stream.

In an embodiment of the invention, the method comprises reconstructing at said receiver, a block from a combination of said second packets and said third packets.

In an embodiment of the invention, the method comprises, once the incomplete block is complete, transmitting the block in a same manner as the first packets only.

Optionally, the method comprises reconstructing and playing back said stream by said receiver as a continuous stream.

In an embodiment of the invention, said second packets and said at least one third packet are transmitted on different channels. Optionally, the receiver listens on fewer channels than said transmitter transmits on. Optionally, at least one channel is dedicated at said receiver for receiving said at least one third packet and comprising stopping receiving on said at least one dedicated channel once the incomplete block is completed at said transmitter. Optionally, the method includes starting receiving said second packets of said previously incomplete block on a different channel from said dedicated channel, at a time sufficient to prevent a delay in continuous playback by the receiver.

Optionally, the method comprises notifying said receiver when said incomplete block is completed.

Optionally, the method includes indicating in each packet its encoding.

In an embodiment of the invention, the method includes dynamically distributing a plurality of reception channels of said receiver to receive packets from said transmission channels, in a manner that ensures a smooth playback of said input stream.

In an embodiment of the invention, said second packets and said at least one third packet are transmitted on a same channel.

In an embodiment of the invention, the method includes, as the incomplete block is completed, less information is send for those portions of the block that were previously transmitted, relative to the newer portions of the block.

There is further provided, in accordance with an exemplary embodiment of the invention, a method of transmitting a data file over a communication medium, comprising:

determining desired relative reconstruction time frames for different parts of the file;

allocating different transmission rates for the different parts of the file, responsive to said determining;

dividing said file into sections utilizing a given protocol that inter-relates the relative reconstruction times and a transmission method;

first transmitting at least a first section of said file responsive to a temporal synchronization of at least one receiver; and further transmitting the rest of the file, by multicasting, independent of the temporal synchronization of said receiver, to have effective transmission rates matching said different transmission rates, such that said parts can be reconstructed in their respective desired time frame.

In an embodiment of the invention, said first transmitting and said further transmitting occur substantially together.

Optionally, said first and said further transmitting utilize multiple channels.

Alternatively, said first and said further transmitting utilize a single channel. Optionally, said first and said further transmitting are interleaved utilizing said single channel.

Optionally, said first section is unicast to said at least one receiver.

Optionally, said receiver decodes said file at an average delay of less than the transmission and reconstruction time of said first section, if said first section were sent in a same manner as the other sections.

Optionally, said receiver requests said first section.

Optionally, said further transmitting comprises transmitting using at least one data carousel.

Optionally, said further transmitting comprises transmitting using a forward error correction code.

There is further provided, in accordance with an embodiment of the invention, a method of transmitting and receiving a data file in a manner substantially independent of a time of commencement of reception by a receiver, comprising:

transmitting a file, using a retransmission bandwidth, such that different parts of the file are retransmitted at different rates; and receiving said file using an effective reception bandwidth, smaller than said retransmission bandwidth, said transmitting being substantially independent of a time of commencement of said receiving; and commencing decoding to allow continuous playback of said file, at a delay from said retransmission, wherein said reception bandwidth is less than 80% of said retransmission bandwidth and wherein a ratio between said delay and a playback time of said file is smaller than 80% of a ratio between said reception bandwidth and said retransmission bandwidth, wherein said receiver reconstructs said stream of data, in real-time, such that said receiver views the data of a block part of said file, prior to the entire block being transmitted.

Optionally, the reception bandwidth is less than 50% or 20% of said retransmission bandwidth.

Optionally, the reception bandwidth is less than 200%, 150% or 130% of a bandwidth required for smooth playback of said file using a synchronized transmission method.

Optionally, said transmission is a multi-channel transmission and wherein said receiver is limited in a number of channels it can receive, said number being smaller than the number of channels being used for transmission.

Optionally, receiving comprises optimizing said receiving, within the limits of said effective reception bandwidth, to minimize said delay.

Optionally, receiving comprises limiting said reception to data required for current playback and for temporally limited sequential playback.

Optionally, said data is reconstructed by said receiver as it is being created.

In an embodiment of the invention, said data is at least partly decoded prior to the complete block being created.

Optionally, said data is at least partly decoded with a delay of less than a transmission and reconstruction time of said block.

Optionally, the method comprises unicasting a part of said block to said receiver.

Optionally, at least one of said blocks is transmitted in an unencoded manner.

Optionally, transmitting comprises multi-casting. Optionally, said encoding and transmission is such that an additional receiver can join the stream and experience a delay of less than the transmission and reconstruction time of a block relative to a designated entry point.

Optionally, said transmitting comprises transmitting using FEC (forward error correction).

Optionally, said transmitting comprises transmitting using at least one data carousel.

BRIEF DESCRIPTION OF THE DRAWINGS

Non-limiting exemplary embodiments of the invention will be described in following description of exemplary embodiments, read in conjunction with the accompanying figures. Identical structures, elements or parts that appear in more than one of the figures are labeled with a same or similar numeral in all the figures in which they appear.

DETAILED DESCRIPTION OF EXEMPLARY EMBODIMENTS OVERVIEW

Figure 1:
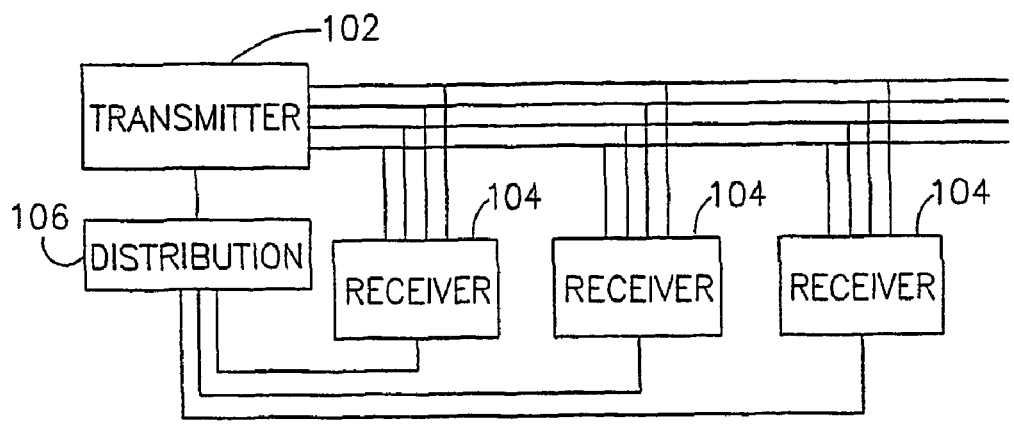
FIG. 1 is a schematic illustration of a data streaming configuration, in accordance with an exemplary embodiment of the invention.

FIG. 1 is a schematic illustration of a data streaming configuration 100, in accordance with an exemplary embodiment of the invention. One or more transmitters 102 transmit a file as a plurality of streams of data or data packets. In some embodiments of the invention, each such stream is multicast. Alternatively or additionally, each stream is repeatedly transmitted, for example using a data carousel or a forward error correction code, as will be described in more detail below.

One or more receivers 104 receive the data streams and reconstruct a copy of the transmitted file. An optional distribution controller 106 is described below.

In an exemplary embodiment of the invention, a receiver 104 includes a local storage unit, for example one or more disks, for storing received parts of the data stream, until they are needed for reconstructing and/or display.

Exemplary File Division

Figure 2:
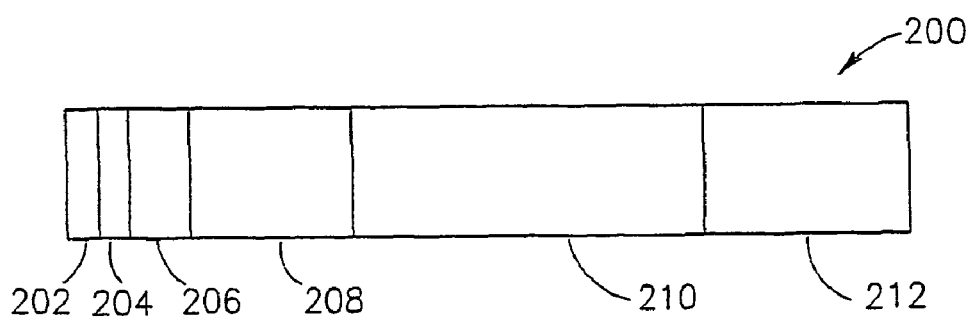
FIG. 2 is a schematic illustration of a file split up for transmission in accordance with an exemplary embodiment of the invention.

FIG. 2 is a schematic illustration of a file 200 split up for transmission in accordance with an exemplary embodiment of the invention. As shown in FIG. 2 file 200 is split into blocks 202, 204, 206, 208, 210 and 212, which are not all the same size. In an exemplary embodiment of the invention, each part of the file is larger by a factor than a previous part, for example a factor of two. The last block may or may not fit this criterion, for example including only a residual portion of file 200. As will be described below, the size of the factor may depend, inter alia, on the ratio between transmission speed and playback. The factor can be lower than or higher than two.

The number of blocks into which file 200 is divided may be determined, for example, by the number of parallel streams available or the ability of the receivers to receive parallel streams. In some embodiments of the invention, as the number of blocks increases, the expected delay before the file can be played back is smaller. In some embodiments of the invention, the expected delay time can be as short as $$DT = \frac{FS}{e^{nBW} - 1},$$

where DT is the delay time, FS is the file size and nBW is the ratio between the total available bandwidth and the bandwidth required for real-time playback. It is noted that smooth playback (e.g., for a limited time and/or after a sufficient delay) is also possible in some cases where the total available bandwidth is smaller than the play-back bandwidth. In some embodiments of the invention, the relationship between the number of blocks, BK, and delay time is $$DT = \frac{FS}{(1 + nBW/BK)^{BK} - 1}.$$

Thus, as a file is divided into more blocks (relative to the number of streams), the expected delay approaches an "e"

base exponent. In some applications, a base of at least 2 or even 2.25 is achieved. Although the relationship between bandwidth and delay is exponential, by properly selecting the block sizes (and/or transmission rates) other relationship, such as quadric or higher power, can be achieved.

File Reconstruction

Figure 3:
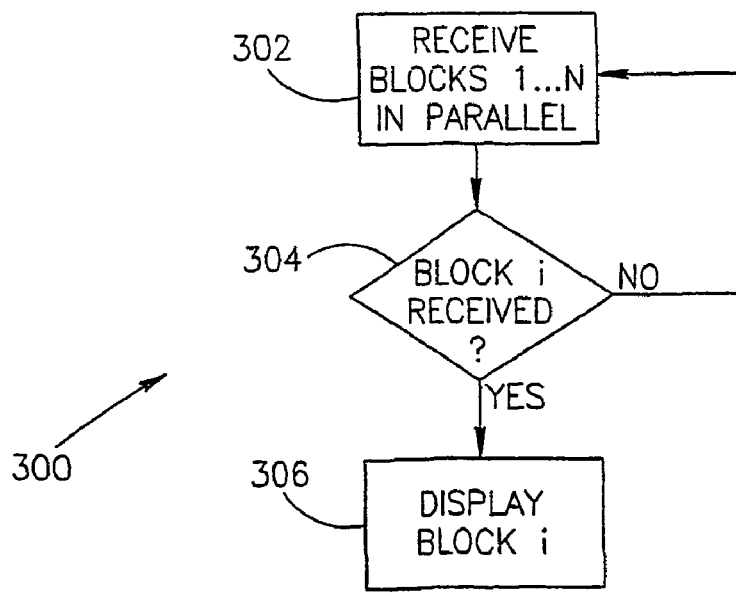
FIG. 3 is a flowchart of a method of reconstructing a transmitted data file, transmitted by streaming in accordance with an exemplary embodiment of the invention.

FIG. 3 is a flowchart 300 of a method of reconstructing a transmitted data file, transmitted by streaming in accordance with an exemplary embodiment of the invention. At 302, a plurality of N of the available K blocks into which the file is divided (possibly, K>>N, optionally K=N) are received in parallel. At 304, if an I'th block is received, it is displayed (306), while continuing to receive the other blocks in parallel. Generally, as the blocks are in ascending order, the blocks will also complete reception in order. If a block is missing, some frames may be skipped, or the playback delayed until the required blocks are received. By selecting a factor of two between block sizes and assuming a real-time transmission rate for each stream, the following effect is achieved: the time that it takes to receive and display a block is the same as the time it takes to receive the next block. Thus, when the display of a first block is completed, the consecutive block is now ready for display. Optionally, the factor is smaller than 2.

It should be noted that in some embodiments, channels are received at a rate lower than the bandwidth required for real-time playback.

Block Size and Delay

In some embodiments of the invention, the size of the smallest block and/or the complete block distribution are selected to achieve a desired expected delay. Alternatively or additionally, the block size(s) are selected in conformance with transmission channel limitations and/or limitations on the availability of multicast address names.

Carousel

In some embodiments of the invention, the blocks are sent as consecutive bits, possibly arranged in packets. In each stream, the bits are repeatedly sent. However, if any bits are missed, a complete cycle must be waited. In addition, in a streaming mode, a minimum expected delay is the time to receive a complete cycle.

FEC Transmission

Alternatively in an exemplary embodiment of the invention, the data is sent using a FEC (forward error correction) code, in which a message of N bits can be reconstructed if any N bits (possibly plus a small overhead) are received. Data can begin to be usefully accumulated from the very first received bit. In addition, if any bits are lost, the following bits can replace them. Exemplary FECs are described for example in Internet draft number draft-ietf-rmt-bb-fec-02 (Nov. 17, 2000), the disclosure of which is incorporated herein by reference.

In an exemplary encoding scheme, in accordance with one embodiment of the invention, a data packet is generated by XORing together a plurality of data sections from the file (each data section is possibly the size of a channel block, while the division into blocks described above, can be unrelated). The selection of data sections to use in each packet, can depend, for example, on the location of the section relative to the start of the file. In an exemplary embodiment of the invention, the percentage of data sections used for a packet in a particular file section (described below) or file block is smaller than 50%, for example, being less than 5%, 10%, 20% or 30%.

In an exemplary decoding method, a set of equations is solved, using the received packets as input. A random number generation seed may be provided with each packet, to indicate which data sections of the original files take part in the packet. In an exemplary embodiment of the invention, the file is divided into sections, and separate packets are generated for each section. These sections may overlap the file blocks or may be considerably smaller. Possibly, packets from earlier sections, may be sent at a higher rate than packets from later sections and/or the section sizes may vary along the file. In an exemplary embodiment of the invention, cross-section packets are also provided, which packets combine data between different sections. Such packets are useful in that they allow to propagate the reconstruction of file section into another file section, even if some packets are missing from the other section. In the streaming implementations, such packets may assist in providing a limited look-ahead ability and/or compensate for missing packets. In an exemplary embodiment of the invention, the cross-section packets are limited to file sections that have similar ordinal numbers.

Preferential Encoding and Transmission

Alternatively or additionally to varying block sizes in order to achieve preferential reception of earlier blocks of the file, same size blocks may be used, with higher transmission rates of packets from the earlier blocks of the file. For example, preferential reception can be achieved by sending packets relating to earlier blocks more often than packets relating to later blocks. Thus, sufficient packets to reconstruct a first block of the file will generally be received sooner than packets required for reconstructing a later part of the file. The expected delay indicates the expected amount of time to accumulate sufficient packets. The above block size factor is translated, in this embodiment, into a relative packet transmission rate. Alternatively or additionally, a combined measure of packet transmission rate and relative block size can be used, to control the relative temporal availability (at the receiver) of different parts of the file.

Alternatively or additionally, preferential encoding schemes, in which one part of the file takes part in more packets than other parts of the file, may also be used to ensure faster reception of those parts. Preferential encoding can be applied to any part of the file, and/or any size units.

It should be noted that a same cost in overhead of preferential encoding may be used to provide a small number of bits with a high additional preference or a large number of bits with a small additional preference. Possibly, different bits in the file are provided with different preference levels, possibly many levels used in a single file. In an exemplary embodiment of the invention, the preference level of consecutive bits is smoothly decreasing, so that the transmission load of the bits is smoothly decreasing.

One potential problem with block-based transmission rate varying methods for achieving preferential reception is that all the bits in a same block have the same preference level, even though the earlier bits in the block often are more urgent than the later bits (for displaying a stream). Although reducing the block size can better match the preference levels and the bit positions, this may not be practical.

In an exemplary embodiment of the invention, preferential encoding is used in the transmission of a single block of the file, to ensure that earlier bits of the block are available for decoding sooner than later bits. Possibly, such preferential encoding is used in conjunction with block based or packet based preferential transmission methods, to achieve more optimal usage of the variable bandwidth, possibly approaching the above "e" based theoretical limit. This method may be used even if the file is transmitted as a single block.

Another potential advantage of bit level preferential encoding is that the preference level of a bit can be changed simply by using it less or more often in later packets (equations).

Congestion Control

One potential problem in a streaming system is that congestion can form at various parts of the network. In an exemplary embodiment of the invention, receiver driven congestion control is used, in which the receiver responds to reduce the congestion. Alternatively or additionally, centrally driven or router driven congestion control is used.

In an exemplary embodiment of the invention, a simple form of congestion control is applied, in that a router that notes congestion can freely drop any packet. The use of FEC implies that no particular dropped packet was of any importance.

In an exemplary embodiment of the invention, the different rate channels are layered. In one method, all the channels include the same content, albeit at different rates Alternatively, different channels contain different packets of the same content, therefore the receiving agent can disconnect itself from some of the channels to eliminate or reduce congestion.

In a different method, some channels include data not found in other channels, for example, data for reconstructing a higher quality stream. Alternatively, the content is distributed between the channels thus packets from all channels are required for reconstructing the complete data. In this method channels with data that is only required at a later time can be disconnected temporarily and reconnected at a later time without effecting the final result if reconnected in time. This method may also be useful in multi-resolution streams, in which the highest resolution requires all the channels to be attended to. In case of congestion over a long period some channels can be disconnected and the resolution allowed to decrease while maintaining continues playback.

It should be noted that if a FEC code is used, using layering does not necessarily add significant overhead or bandwidth requirements to the transmission system.

The following papers describe applications of layering, their disclosures are incorporated herein by reference: S. McCanne, V. Jacobson and M. Vetterli "Receiver Driven Layered Multicast" ACM SIGCOMM, pp. 117-130, 1996, Rubenstein, Dan, Kurose, Jim and Towsley, Don, "The Impact of Multicast Layering on Network Fairness", Proceedings of ACM SIGCOMM'99, L. Vicisano, L. Rizzo, J. Crowcroft, "TCP-like Congestion Control for Layered Multicast Data Transfer", IEEE Infocom '98, San Francisco, Calif., Mar. 28-Apr. 1, 1998 and Vicisano, L., "Notes On a Cumulative Layered Organization of Data Packets Across Multiple Streams with Different Rates", University College London Computer Science Research Note RN/98/25, Work in Progress (May 1998).

Delay Prevention

In streaming applications, it is typically required that a bit should not only be available before the next bit in the stream, but that the bit should also be available on time for display.

In some cases, an anticipated bandwidth is not available or an unexpected event reduces the available bandwidth. This might cause an unexpected delay at the receiver, in that the bit is not available on time for display.

In some stream types, bits that are not available can be dropped, for example, in some multi-resolution video streams. Alternatively or additionally, the stream may be paused until the bit, or a sufficient string of bits is available. Alternatively or additionally, at least in some stream types the bit may be estimated, for example, based on previous or neighboring bits.

Alternatively, the delay is avoided. In one exemplary embodiment of the invention, the size factor of blocks (or other method of controlling block sizes) in the file is made smaller than would be possible using the available bandwidth, so that a next block can be available for decoding sooner than the completion of presentation of a previous block. Thus, if an unexpected delay occurs in the reception of the next block, a small delay in block presentation does not affect its display on time.

In an exemplary embodiment of the invention, when congestion is anticipated and/or detected during the transmission of a file, the original file is re-divided into a different set of blocks (e.g., larger blocks and/or a different size factor), so that smooth playback, is maintained, albeit at a lower rate and/or greater delay.

In an exemplary embodiment of the invention, bit level preference setting or resetting is used, in that previously transmitted bits are transmitted less often in the future, so that a desired preference level is achieved for those bits.

Minimal Delay Transmission

One type of delay is caused by the usage of an asynchronic transmission system, where the transmitter transmits blocks independently of the need of the receivers. In particular, in multicasting, the transmitter cannot send information that matches the needs of multiple disparate receivers. Thus, a typical receiver will experience a delay dependent on the minimal block size used by the transmitter, on the average, the time that it takes to receive and decode a block. Using a FEC method the reception of a block can be started independently of the time of joining to a channel.

In an exemplary embodiment of the invention, delay is reduced by using synchronous transmission for the first block of data. In one example, packets that comprise the first block are transmitted by unicasting so that the receiver can display or otherwise use the received packets as soon as they arrive. Optionally, the packets are unencoded or encoded differently (e.g., corresponding to a smaller block size or referring to data that was already sent or will be sent shortly) than the other blocks, to allow the receiver to quickly utilize the packets. In some embodiments of the invention different block sizes are chosen in order to implement synchronous transmission more efficiently. Other encoding, such as encryption, may also be applied, to all packets.

In an exemplary embodiment of the invention, the bandwidth of channels used for such unicasting is traded off with the bandwidth used for multicasting, to achieve a desired tradeoff between overall transmission efficiency and initial delay. This tradeoff may also depend on the number of receivers. In some cases, groups of receivers are grouped according to their start time and they each receive a semi-personalized multicasting of the first block, that matches the receivers needs to within a time resolution dictated by the number of groups used.

Optionally, a receiver can request specific packets from the transmitter for this first block. In one example, the specific packets relate to the particular entry point into the file selected by the receiver. In another example, the receiver asks for retransmission of bad or missed packets.

Data Type Specific Applications

Many of the embodiments described herein assume that an importance of a bit is monotonicly determined by its position in the stream. However, in some data types, the importance of a bit may depend on other factors as well. For example, in a stream of MPEG, in each frame, some bits are more important than others.

In an exemplary embodiment of the invention, the encoding method is tailored to the data type that is being transmitted. For example, a block of the file is divided into sub-blocks having bits of different importance levels, with each sub-block being transmitted at a different rate. Possibly, the transmission level of a sub-block of important bits from a later block is higher than the transmission rate of a sub-block with low importance bits from a previous block.

Alternatively to modifying the encoding scheme, in an exemplary embodiment of the invention, the stream is reorganized prior to being encoded so that it conforms to the rule that earlier bits in the stream are more important than later bits. When the stream is received it may be reorganized back to its original form (possibly, less any bits that did not arrive on time). Optionally, the reorganizing before the decoding and after the decoding are performed by data-dependent pre- and post-processing units (e.g., software and/or hardware).

Multiple Entry Points

The above method is especially useful for files that are viewed starting at their beginning. For files with multiple entry points, the file may be treated as a plurality of sub files, each with its own starting point having its own expected delay.

Multiple entry points can also be provided by varying the packet transmission rate over the file, for example providing greater transmission rates at the desired entry points. Alternatively or additionally, to control packet transmission rates, other preferential encoding schemes can be used, for example using earlier blocks of the file in a greater percentage of the packets.

In some embodiments of the invention, when a user stops viewing a media file, the last block and the previously received un-displayed blocks are saved, so that continued viewing of the file can resume with a short or substantially no delay. Alternatively or additionally, a user may use the previously received packets for a playback function. Optionally, for points in the file where playback is expected, the file structure is inverted in time, with earlier blocks being short and/or transmitted more often, so that playback can be rapid. Alternatively or additionally, packets received and relating to later blocks of the file, may be used for a limited preview, for example of a small number of frames.

The above-described methods may require a memory to store very large files. By splitting file 200 into multiple parts, each of which is processed and transmitted as above in series (expect for the first block, whose transmission overlaps with a previous part), these memory requirements may be reduced.

Receiver-Transmitter Bandwidth Matching

Various other parameters of the above-described methods can be traded-off.

In an exemplary application, a receiver may be able to receive in parallel a plurality of storage streams and may require a memory buffer for each stream, to make disk access (e.g., for temporary storage of the stream) more efficient. Such a device (or transmission channel) may be limited, for example, in total receiver bandwidth availability, disk size, memory, number of streams that can be listened to in parallel and/or number of streams that can be written or read to the disk in parallel.

In some embodiments of the invention, if the number of received streams is smaller than the number of transmitted streams, the receiver receives as many streams (e.g., of the higher priority ones) as it can in parallel, and as one block is finished being received, disconnects that stream connects to the next one and starts receiving packets from it. For example a receiver may be only able to receive M times real time playback speed. While the information divided to K blocks is transmitted at N times real time playback speed (M<N). Such a receiver would connect to L streams where $$L = \left\lfloor \frac{MK}{N} \right\rfloor,$$

thus resulting with a delay time $$DT = \frac{FS}{\frac{N}{K} \sum_{i=0}^{\left\lfloor \frac{K-1}{L+1} \right\rfloor} \left(-\frac{N}{K}\right)^i \cdot \left( \sum_{j=\max\{0, K-(i+1)(L+1)+1\}}^{K-i(L+1)-1} \binom{j+i}{i} \left(1+\frac{N}{K}\right)^j \right)}$$

It should be noted that this expression has a similar exponential behavior as does the theoretical limit described above. It should also be noted that M and N are not necessarily integers. In an exemplary application, by delaying longer than the theoretically expected delay time before starting displaying, the receiver can expect to have enough information for continuous display at any time. In an example, a 2 hour movie when N=7, if M=7 then an expected delay is 13.5 if M=1.5, then an expected delay is 114 sec.

The other limitations (e.g., disk r/w channels, memory and total bandwidth) can be translated into a limitation on the number of channels that can be effectively received at a time. Thus, it may be that a channel is not connected to (or data received at a lower rate by packet dropping) for lack of processing power at the receiver to handle the overhead of the extra channel, while reconstructing previously received channels.

It should be noted that even if M is close to 1, for example, 1.1 or 1.2, relatively short delays can be achieved, as shown by the above equation.

Size Factor

In an exemplary embodiment of the invention, some overhead time is provided for each received block to be reconstructed, thus allowing a non-ideal CPU to be used and/or allowing for temporary bad network conditions delaying packet reception. Alternatively or additionally, the received blocks are decoded continuously, preventing CPU load peaks.

In another exemplary tradeoff, if the reception time is slower than real-time playback, for a particular channel, the relative size factor is made smaller than 2. Alternatively or additionally, if the reception time is faster than real-time, the relative size factor is made greater than 2. It should be noted that in some embodiments of the invention, real time playback with relatively short delays are achieved even though each streaming channel is the same speed or slower than the playback speed.

In an exemplary embodiment of the invention, N=M, so L=K. The factor then may be, for example, 1+N/K.

Number of Actual Channels

In some applications, two or more of the streaming channels may be mixed into a single channel. Alternatively or additionally, some transmission channels may be faster than others (in practice). Optionally, the number of blocks, the size of the blocks and/or the relative size factors are dependent on the relative speed of the various channels. Possibly, the channel rates are monitored in real-time and the size of blocks modified accordingly, for example using distribution controller 106. In particular, the method of differential transmission rates for different parts of the file may be usefully applied using single channel multicasting, in which packets relating to different parts of the file are selected for transmission at a different relative rate.

Overlap Between Blocks

In some exemplary embodiments of the invention, the blocks do not overlap. Alternatively, there is at least some overlap between the blocks into which the file is divided. Alternatively or additionally, at least some of the bits in the file are encoded to have a higher probability of being decoded sooner than the rest of the file. This can allow beginning playback of the next block even before it is all received.

Alternatively or additionally, overlap between file blocks is provided by at least some of the packets being cross-block packets. Such packets can assist in reconstructing the next block. Alternatively or additionally, such packets can be directed to the beginning of the next block.

In an exemplary embodiment of the invention, cross-block packets use the solution of one channel to assist in solving equations for another channel.

Exemplary Applications

Referring back to FIG. 1, a distribution controller 106 may be provided to decide which data files are streamed and/or multicast and/or what expected delay to offer. Such a controller may base its actions, for example, on request and/or responses from receivers 104 and/or channel limitations. Controller 106 may also be used to allow receivers 104 to respond to the received data, for example, emulating an interactive HTTP connection.

In a particular example of cable television, a 128 minute movie may be provided with an expected delay of no more than 0.5 minutes, by broadcasting the movie on 8 regular channels, as described above. In a standard video on demand transmission method, where each channel transmits the whole movie, at a different start time, the expected delay is 16 minutes. The parallel-received blocks may be stored, for example, using a TiVo (or other television transmission recorder). Such broadcasting could also take advantage of methods known in the art for targeting only parts of the cable network. Alternatively or additionally, the multicasting is received at network nodes and then re-broadcast as needed. Although FEC coding may be used, in some embodiments of the invention, dropped frames may not be a problem and no coding is used. In some implementations, the data is encrypted and/or compressed prior to transmission.

In another exemplary embodiment, the communication network is a satellite, which typically has associated delay and link problems of sending a request for a specific media file.

In another example embodiment, the communication network is the Internet, where, for example, a movie server may desire to maintain constant data transmission rates, without being required to respond to requests by starting to send the same movie at multiple times. In some cases, when multiple requests arrive, additional channels are allocated to the movie, significantly reducing the expected delay time.

In another exemplary embodiment, the communication network is a cellular telephone network or a radio network, where a user may desire to flip between channels, and always start at a beginning of a presentation item.

Although a packet based transmission network may be used, the above method can also be applied to other types of networks, including both synchronous and asynchronous networks and packet based, switching based and/or continuous transmission networks. Also, the above method may be applied to both digital and analog communications.

Feedback for Channel Setup

In some of the above embodiments, the transmitter transmits an index of the channels and their mapping into media presentations. In some embodiments, controller 106, as described above, may use responses to this index, to decide which files to broadcast, at what rate, how many and which entry points and/or how many sections to divide the file into.

Channel Changing Support

In some embodiments of the invention, a receiver (e.g., a television, set top box or a computer) may record packets from a plurality of channels, thus allowing a rapid transition between a first channel and other channels. Alternatively or additionally, an exemplary channel may include some packets relating to other channels, for example channels of related content and/or language.

Update Using Differential Decoding

A feature of some types of broadcast channels is that their contents change only slowly over time. For example, news channels often continuously transmit a same content, while changing a small number of news items, every so often.

In an exemplary embodiment of the invention, a differential decoding ability is used to selectively receive and decode only enough packets for displaying the changes in an item. In one example of differential decoding, copies of previously received packets are stored, together with a code indicating the file version to which they apply. Only packets to the parts of the file updated in a newer version need to be downloaded and the old packets can be reused. Alternatively or additionally, the file itself is used as a partial solution for recovering data from received packets, thus reducing the number of packets to be decoded. This method can be used, for example, when a FEC is used, of the type where each packet is a XOR of a plurality of packets. The version number of such a packet is the newest version number of any block used for the packet. During reconstruction, a set of equations linking together blocks and packets is solved. The old data may be used to assist such a solution.

Two particular examples of such a slowly changing channel is the Internet WWW page of CNN (which is widely viewed) and the CNN daily continuous newscast. In addition to the changes caused by the change in news, some changes may occur as result of the personalization of the channel to a particular user and/or as a result of a request made by the user. By sending the channel using the methods described above, two advantages can be achieved. First, a short delay for retrieving most of the relevant channel is achieved, using a relatively low bandwidth. Thus, only the differences for particular viewers need to be sent. These differences can be sent, for example, by broadcast or by unicast (in Internet) or as data packets (in television) to be reconstructed by the receiver for the particular viewer. Alternatively or additionally, differential decoding can be used to allow a receiver to receive only a small number of packets and use these packets to display the personalized/changed page.

In one application, such a multicasting of WWW pages is used, together with a controller that receives responses from users, as a means for supporting an HTTP protocol using multicasting.

Update Using Preferential Encoding or Overriding

In some exemplary embodiments of the invention, instead of sending new replacement files or file parts, particular bits are over-ridden. In an exemplary embodiment of the invention, bits are overridden by providing new packets for the same bits, with other bit values. When solving the equations, the new bit values may be used in stead of the old ones. Alternatively or additionally, the new bit vales may be added to the old bit values, generating a set of over-constrained equations. If the new bits are in the majority, the solution will be the new data.

In an exemplary embodiment of the invention, the new bits are provided at a higher bit rate than other bits, for example, using preferential encoding techniques. Alternatively or additionally, whole packets including replacement bits are sent at a higher rate.

Optionally, a message indicating that old cross-packet buckets or old packets are stale is provided as well. Alternatively or additionally, a time period is defined, for example, in the data packets, that indicates that the packet is stale once the time passes, unless otherwise indicated. A separate channel may be provided with such staleness indicators.

Alternatively or additionally, the new packets include, for example in the header, an indication that old packets are stale and/or that the new packet is a replacement packet. Alternatively or additionally, the packet includes an indication of the bit selection method used for the new packet, especially if a different type of preferential encoding is used.

Optionally, only the changed parts of the file are re-encoded and/or retransmitted, for example, trusting over-constraint solution methods to overcome ambiguities between data packets for different parts of the file and/or between cross-bucket packets and new packets.

Real Time Encoding

In an exemplary embodiment of the invention, the above data streaming methods are used for streaming of real-time generated data. In an exemplary embodiment of the invention, the current viewing time is considered an entry point where minimum delay is desired. This may be achieved for example, by using a minimum block size for the current data. Alternatively, data that is being transmitted as it is generated is not encoded using a FEC code, while earlier, previously data is FEC-encoded. This allows the current data to be displayed at a shorter delay or no delay.

Optionally, the beginning of the stream is also defined as an entry point. Possibly, additional entry points are defined. In a system that uses FEC-encoding for real-time data, the effective transmission rate of bits for the current time (as it moves into the past) goes down until a generally desired bit rate based on the position in the file is achieved. This reduction may be smooth or it may be step-wise.

In an exemplary embodiment of the invention, when a user joins a real-time event, the user receives data in parallel from multiple channels, possibly at a higher than the streaming data rate, possibly in order to catch-up with respect to acquiring the data stream. Alternatively or additionally, a user may activate fast forward and/or frame skipping functions (e.g., skip advertisements) in order that his display also catches up with the real-time event. Alternatively or additionally, a user can select a different starting point in the stream.

It should be noted that as an event unfolds, the channels that relate to later parts of the event cannot contain data for their respective parts. Such channels may be unused, maintained at a low data rate and/or used to assist in catching up, by transmitting unencoded information or provide additional bandwidth for transmitting previous information.

Optionally, as the stream continues to increase in duration, the transmission rate for all stream parts can be updated to reflect a desired reception and/or expected delay behavior, for example, using preferential encoding or transmission methods.

In an exemplary embodiment of the invention, a particular receiver may be viewing a rerun of the event, after many other viewers have viewed it. In an exemplary embodiment of the invention, the packet transmission probabilities are adapted to take into account sections where entry may be desirable and/or sections where a playback function is desirable. These sections may be selected by an operator and/or automatically responsive to requests from viewers.

In an exemplary embodiment of the invention, the above streaming methods are integrated with other data streaming methods. For example, alternatively or additionally to encoding using a FEC code, codes used for streaming, for example for compression, are used. Possibly, header sections of the stream and/or periodic key frames are transmitted on a high-priority channel, to allow reconstructing the stream, from its middle.

Realtime Streaming with Mixed Packet Types

As described above, in an exemplary embodiment of the invention, a file to be transmitted is divided into blocks of non decreasing size. These blocks are transmitted optionally as FEC encoded packets on different channels. A receiver can join the transmission at any time and registers to receive in parallel a subset of the transmitted channels. When the receiver has enough packets to decode a particular block the receiver disconnects from one channel and connects to a new channel (with packets for a different block) instead.

However, since real-time events are continuous, future blocks do not exist. Further at any given time, the "current" block is incomplete, for example for reason of the data not existing, due to a delay in encoding or for any other reason. In an exemplary embodiment of the invention, such incomplete blocks are transmitted using unencoded packets, and once completed, encoded packets are used, optionally on a same channel. In an exemplary embodiment of the invention, a block can be reconstructed from a combination of encoded and unencoded blocks, using the unencoded blocks as solutions for the equations presented by the encoded blocks. Alternatively, all or most packets are encoded, with the packets including reference only to parts of the block that exist. As the transmission proceeds, the frequency of such reference may go down, and the frequency of reference to later parts of the block increase.

In an exemplary embodiment of the invention, the number of channels used for transmitting the unencoded data is such that the total transmission rate of these channels is equal to the stream creation rate or slightly higher. Optionally, channels are dedicated for a particular block. Alternatively, some channel capacity may be used for packets from other blocks.

In use, a receiver registers, for example, to the same number of channels as described above for the non-real-time case. Depending on the time the receiver joins relative to the beginning of the event, the first channels received by the receiver may be composed of completed blocks, which are optionally fully encoded. As the transmission progresses the user can optionally catch up with the transmission of unencoded channels. In some cases, a block fills up while being transmitted as unencoded packets and the transmitter will encode the block and start transmitting encoded packets on the channel. Due to the additive nature of the coding scheme as explained above regarding differential encoding, receivers at different stages of reception can continue receiving without being delayed by the transition. A receiver that has finished receiving all parts of the file prior to the current real time data can stay registered to the number of channels needed to keep up with the stream creation rate. The contents of the stream are optionally unencoded packets. Generally, if correct sizes are chosen for the blocks, the receiver will always have finished receiving a block before it needs to be displayed. However, once a receiver has caught up to the stream creation, the receiver may be limited by the rate of creation of data and the packet size. In some cases, the data in the block will be displayed before the block is completed.

An exemplary choice of block sizes which will meet these requirements have the following properties: For a transmitter transmitting at N times realtime playback speed with K blocks and a receiver receiving at M times realtime playback speed where $M \leq N$ and the user is registered to L of the blocks, R is the transmission rate for every channel and follow the following relation $$R = \frac{M}{L} = \frac{N}{K}.$$

The block sizes ($X_0$ to $X_{k-1}$) form a geometric series with a factor of Q where $X_i = X_0 Q^i$ the delay time DT is $DT = X_0/R$ and Q follows the relationship $R(1+Q+Q^2+\ldots+Q^{L-1}) = Q^L$. Given R and L, the value of Q follows. As noted above, block size and channel rate may be traded off.

A further exemplary method of reception of a real time transmission which does not use a further constraint on block sizes as the previous method is that the receiver registers to receive blocks as in a fully encoded transmission as described above. Free channels designated to receive non existent data are utilized to receive the real time (and possibly unencoded) data When the current block of real time data is completed and encoded its reception is discontinued until the time when the amount of data received so far from this block is equal to the amount which would have been received if it had been fully encoded from the beginning of its reception. During the time that this block's reception is discontinued, all free channels receive data from the new current block of real time data.

In some embodiments of the invention a carousel or multiple carousels are used on multiple channels instead of forward error correction encoding.

In some embodiments of the invention the length of the real time event is not known ahead of time therefore the transmitter needs to update transmission parameters such as transmission speed and/or number of channels during the transmission.

In an exemplary embodiment of the invention the viewer is given the option to start receiving from the beginning of the stream or from the position currently being created. Optionally, if a viewer chooses to start viewing from the currently created position, the viewer can simultaneously acquire blocks starting from the start of the stream, so that the user can later perform a replay of the entire stream. In order to simultaneously receive the current stream and the stream from the beginning the viewer needs to receive at a higher bandwidth of at least the stream creation rate.

Exemplary applications of the system for real-time transmissions and non real time transmissions as mentioned previously include television broadcast systems or the Internet. An exemplary implementation optionally uses various reception devices either stupid devices or smart devices such as a TV or a computer or other reception or recording devices identifying content for example by program ID. Additionally, these transmissions may be transmitted over cable networks or over satellite. Optionally, the system is implemented for transmissions of radio networks, cellular telephone networks, or standard telephone networks.

In an exemplary embodiment of the invention the system is implemented over a digital communication system. Alternatively the system is implemented over an analog communication system.

Multiple Transmitter Architecture

In some network types, instead of using a single transmitter, a plurality of transmitters may be provided, for example in different parts of the network, with each transmitter multicasting a different part of the file. Such a geographical dispersion may reduce bottlenecks in the network.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method of streaming data, comprising:
receiving an input stream of data, at a transmitter;
dividing the input stream into a plurality of blocks, at least one of which blocks is incomplete;
generating a plurality of first packets based on at least one block of data;
generating at least one second packet from at least one as yet incomplete block of data;
said block comprising recently received data;
transmitting said at least one first packet and at least one second packet to a receiver that can reconstruct said stream from said first packets and said second packets, said transmitting utilizing a differential protocol by which different parts of the data are transmitted at different rates, so that a receiver can join the transmission at any time and start receiving the data at a minimum delay; and generating at least one third packet from said at least one incomplete block;

said at least one third packet being based at least in part on data received subsequent to data forming the basis for the at least one second packet;

wherein said at least one second packet is transmitted at a higher rate than mandated by said protocol to compensate for a later repeated transmission of information carried in said at least one second packet at a lower rate than mandated by the protocol, once said at least one third packet is generated and transmitted.

2. A method according to claim 1, wherein said input stream is received by said receiver as it is being created.

3. A method according to claim 1, wherein said input stream is decodable by said receiver with a delay of less than the transmission and decoding time of one block, from said transmitter.

4. A method according to claim 1, wherein said receiver has a reception bandwidth less than 150% of a transmission bandwidth of said transmitter.

5. A method according to claim 1, wherein said receiver has a reception bandwidth less than 130% of a transmission bandwidth of said transmitter.

6. A method according to claim 1, wherein said receiver has a reception bandwidth less than 120% of a transmission bandwidth of said transmitter.

7. A method according to claim 1, wherein said receiver has a reception bandwidth loss than 110% of a transmission bandwidth of said transmitter.

8. A method according to claim 1, wherein said at least one second packet is not FEC (forward error correction) encoded.

9. A method according to claim 1, wherein said at least one second packet is FEC (forward error correction) encoded to inter-relate data already sent for said incomplete block.

10. A method according to claim 1, wherein said at least one first packets are FEC (forward error correction) encoded.

11. A method according to claim 1, wherein said at least one first packets are sent using a plurality of carousels.

12. A method according to claim 1, wherein said at least one first packets are sent using a single carousel.

13. A method according to claim 1, wherein said at least one third packet is unicast.

14. A method according to claim 1, wherein said at least one first packets are multicast.

15. A method according to claim 14, wherein said transmission comprises transmission over a TV broadcast system.

16. A method according to claim 14, wherein said transmission comprises transmission over a TV cable system.

17. A method according to claim 14, wherein said transmission comprises transmission over a TV satellite system.

18. A method according to claim 14, wherein said transmission is digital.

19. A method according to claim 14, wherein said transmission is analog.

20. A method according to claim 14, wherein said transmission comprises transmission over a computer network.

21. A method according to claim 14, wherein a receiver can join said transmission in an asynchronous manner and experience a delay of less than the transmission and decoding time of one block, relative to a designated entry point into said stream.

22. A method according to claim 21, wherein said entry point is a start of said stream.

23. A method according to claim 21, wherein said entry point is a current time point of said stream.

24. A method according to claim 1, comprising, reconstructing at said receiver, a block from a combination of said second packets and said third packets.

25. A method according to claim 1, comprising, once the incomplete block is complete, transmitting the block in a same manner as the first packets only.

26. A method according to claim 1, comprising reconstructing and playing back said stream by said receiver as a continuous stream.

27. A method according to claim 1, wherein said second packets and said at least one third packet are transmitted on different channels.

28. A method according to claim 27, wherein said receiver listens on fewer channels than said transmitter transmits on.

29. A method according to claim 27, wherein at least one channel is dedicated at said receiver for receiving said at least one third packet and comprising stopping receiving on said at least one dedicated channel once the incomplete block is completed at said transmitter.

30. A method according to claim 29, comprising starting receiving said second packets of said previously incomplete block on a different channel from said dedicated channel, at a time sufficient to prevent a delay in continuous playback by the receiver.

31. A method according to claim 1, comprising notifying said receiver when said incomplete block is completed.

32. A method according to claim 1, comprising indicating in each packet its encoding.

33. A method according to claim 27, comprising dynamically distributing a plurality of reception channels of said receiver to receive packets from said transmission channels, in a manner that ensures a smooth playback of said input stream.

34. A method according to claim 1, wherein said second packets and said at least one third packet are transmitted on a same channel.

35. A method according to claim 1, comprising, wherein, as the incomplete block is completed, less information is send for those portions of the block tat were previously transmitted, relative to the newer portions of the block.

36. A method of transmitting a data file over a communication medium, comprising:

determining desired relative reconstruction time frames for different parts of the file;

allocating different transmission rates for the different parts of the file, responsive to said determining;

dividing said file into sections utilizing a given protocol that inter-relates the relative reconstruction times and a transmission method;

first transmitting at least a first section of said file responsive to a temporal synchronization of at least one receiver; and further transmitting the rest of the file, by multicasting, independent of the temporal synchronization of said receiver, to have effective transmission rates matching said different transmission rates, such that said parts can be reconstructed in their respective desired time frame.

37. A method according to claim 36, wherein said first transmitting and said further transmitting occur substantially together.

38. A method according to claim 36, wherein said first and said further transmitting utilize multiple channels.

39. A method according to claim 36, wherein said first and said further transmitting utilize a single channel.

40. A method according to claim 39, wherein said first and said further transmitting are interleaved utilizing said single channel.

41. A method according to claim 36, wherein said first section is unicast to said at least one receiver.

42. A method according to claim 36, wherein said receiver decodes said file at an average delay of less than the transmission and reconstruction time of said first section, if said first section were sent in a same manner as the other sections.

43. A method according to claim 36, wherein said receiver requests said first section.

44. A method according to claim 36, wherein said further transmitting comprises transmitting using at least one data carousel.

45. A method according to claim 36, wherein said further transmitting comprises transmitting using a forward error correction code.

46. A method of transmitting and receiving a data file in a manner substantially independent of a time of commencement of reception by a receiver, comprising:
transmitting a file, using a retransmission bandwidth, such that different parts of the file are retransmitted at different rates; and
receiving said file using an effective reception bandwidth, smaller than said retransmission bandwidth, said transmitting being substantially independent of a time of commencement of said receiving; and
commencing decoding to allow continuous playback of said file, at a delay from said retransmission, wherein said reception bandwidth is less than 80% of said retransmission bandwidth and wherein a ratio between said delay and a playback time of said file is smaller than 80% of a ratio between said reception bandwidth and said retransmission bandwidth,
wherein said receiver reconstructs said stream of data, in real-time, such that said receiver views the data of a block part of said file, prior to the entire block being transmitted.

47. A method according to claim 46, wherein said reception bandwidth is less than 50% of said retransmission bandwidth.

48. A method according to claim 46, wherein said reception bandwidth is less than 20% of said retransmission bandwidth.

49. A method according to claim 46, wherein said reception bandwidth is less than 200% of a bandwidth required for smooth playback of said file using a synchronized transmission method.

50. A method according to claim 46, wherein said reception bandwidth is less than 150% of a bandwidth required for smooth playback of said file using a synchronized transmission method.

51. A method according to claim 46, wherein said reception bandwidth is less than 130% of a bandwidth required for smooth playback of said file using a synchronized transmission method.

52. A method according to claim 46, wherein said transmission is a multi-channel transmission and wherein said receiver is limited in a number of channels it can receive, said number being smaller than the number of channels being used for transmission.

53. A method according to claim 46, wherein receiving comprises optimizing said receiving, within the limits of said effective reception bandwidth, to minimize said delay.

54. A method according to claim 46, wherein receiving comprises limiting said reception to data required for current playback and for temporally limited sequential playback.

55. A method according to claim 46, wherein said data is reconstructed by said receiver as it is being created.

56. A method according to claim 46, wherein said data is at least partly decoded prior to the complete block being created.

57. A method according to claim 46, wherein said data is at least partly decoded with a delay of less than a transmission and reconstruction time of said block.

58. A method according to claim 46, comprising unicasting a part of said block to said receiver.

59. A method according to claim 46, wherein at least one of said blocks is transmitted in an unencoded manner.

60. A method according to claim 46, wherein said transmitting comprises multi-casting.

61. A method according to claim 60, wherein said encoding and transmission is such that an additional receiver can join the stream and experience a delay of less than the transmission and reconstruction time of a block relative to a designated entry point.

62. A method according to claim 46, wherein said transmitting comprises transmitting using FEC (forward error correction).

63. A method according to claim 46, wherein said transmitting comprises transmitting using at least one data carousel.

* * * * *